Figure 1:
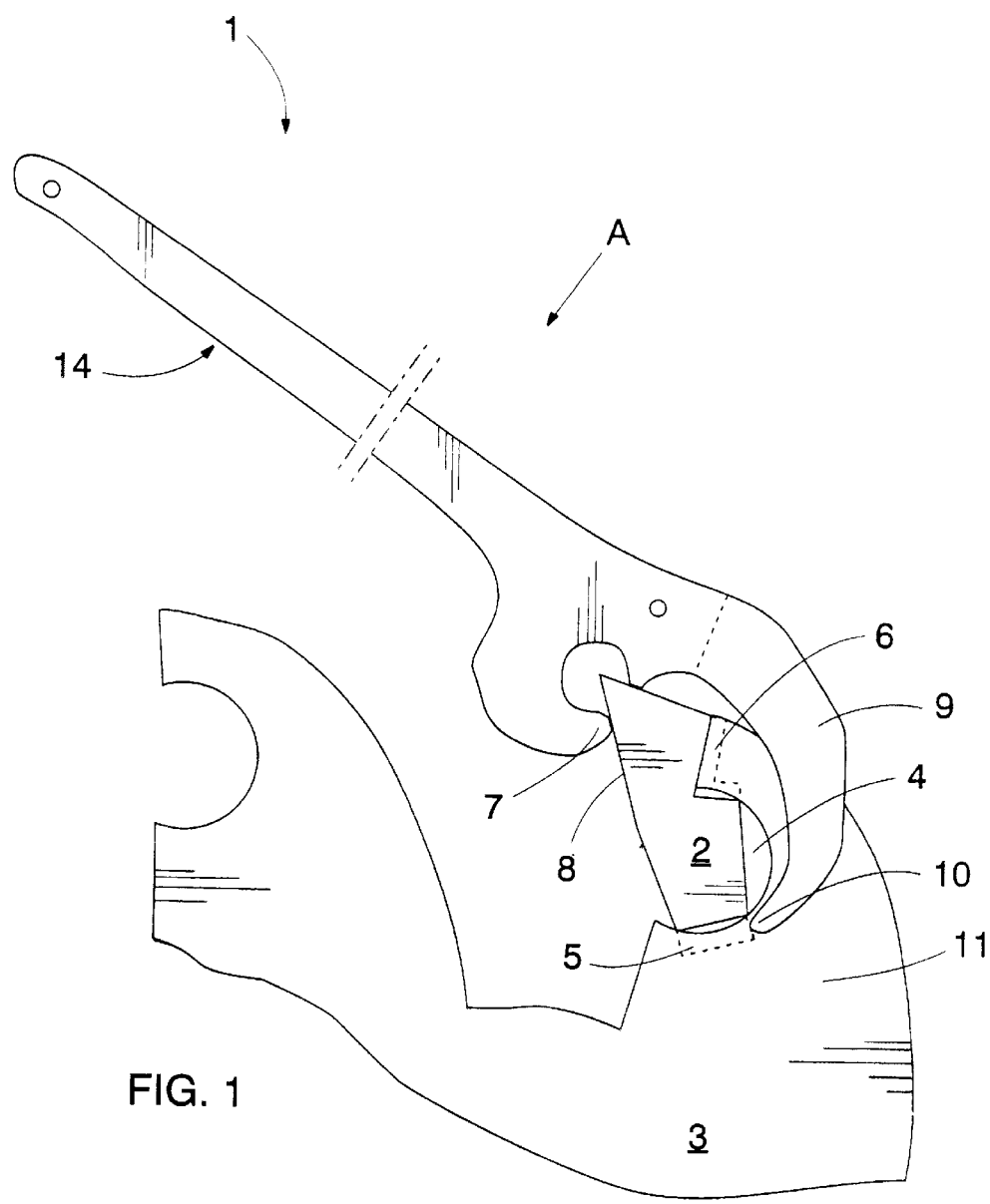

United States Patent [19]
Vuorinen et al.

[11] Patent Number: 6,052,881
[45] Date of Patent: Apr. 25, 2000

[54] TOOL

[75] Inventors: Markku Vuorinen, Tampere; Jari Hakala, Toijala, both of Finland

[73] Assignee: Hackman TTT OY AB, Toijala, Finland

[21] Appl. No.: 09/263,637

[22] Filed: Mar. 5, 1999

[30] Foreign Application Priority Data

Mar. 10, 1998 [FI] Finland ..................................... 980540
Apr. 20, 1998 [FI] Finland ..................................... 980872

[51] Int. Cl.$^7$ ..................................................... B23P 19/04
[52] U.S. Cl. .................................................. 29/267; 29/270
[58] Field of Search ........................... 29/267, 270, 278; 81/485; 254/131.5

[56] References Cited

U.S. PATENT DOCUMENTS 5,495,651  3/1996  Tsuha ........................................ 29/235

Primary Examiner—Timothy V. Eley
Assistant Examiner—Benjamin M. Halpern
Attorney, Agent, or Firm—Alston&Bird LLP

[57] ABSTRACT

The invention relates to a tool which is intended for inserting separate tooth bits into a saw blade body by turning. The tool (1) comprises an intermediate part (13) with separate turning plates (12a, 12b) arranged on the sides thereof to cover at least that end of the tool which comes into contact with the tooth bit (2), whereby a free space is formed between the turning plates, which enables the tool to be brought to a saw tooth (11) in such a way that the tooth bit can be turned by support shoulders (5) provided in the tooth bit by means of the tool's first insertion heads (10). By means of the tool's intermediate part the space between the turning plates transversally to the blade is arranged to correspond to the thickness of the blade. The intermediate part is preferably formed from at least one suitably thick plate.

8 Claims, 2 Drawing Sheets

TOOL

The invention relates to a tool which is intended for inserting separate tooth bits into seats provided in a saw blade body and which comprises a turning arm and insertion surfaces to be fitted against the tooth bit for transmitting a force produced by the turning arm to the tooth bit.

Shapelocked, replaceable tooth bits are used, for instance, in circular saw blades employed in woodworking, as well as in band saw blades, handsaw blades, gang or bow saw blades and the like. Thanks to the shape-locked arrangement, tooth bits need not be brazed, riveted or connected in any other fixed manner to a blade body, but the tooth bits are firmly locked to place thanks to the tooth bit and the matching seat provided in the blade body. In principle, one advantage of the shapelocked arrangement over attachment by brazing, for instance, is that tooth bits can be attached and detached readily and quickly. Conventionally tooth bits are attached in a fairly clumsy manner, for instance, by forcing them into their seats by means of various pliers or by tapping them to position with a hammer. It is obvious that this kind of insertion cannot be effective nor advantageous as regards the tooth bit. Since the tooth bit is generally made of the hardest possible material in view of its wear resistance, such as high-speed steel, hard metal, ceramic or some other suitable tooth bit material, the tooth bit does not stand such rough handling as described above, but due to its brittleness it breaks relatively easily. In addition, the pre-sharpened cutting edge of the tooth bit may be damaged when said insertion methods are employed.

The object of the present invention is to provide a tool for inserting shapelocked tooth bits, which tool can be adjusted in a simple manner to match blades of various dimensions and which can be manufactured at a lower cost than before thanks to its structure.

The tool in accordance with the invention is characterized by comprising an intermediate part with turning plates arranged on its opposing sides, parallel with the blade sides, in such a way that the tool's one end, which comes into contact with the tooth bit, is branched and that first insertion surfaces are provided in the turning plates.

The basic idea of the invention is that the tool comprises an intermediate part with separate turning plates arranged on both sides thereof in such a way that branches are formed at that end of the tool which comes into contact with the tooth bit, and between the branches there is space for the tooth bit of the blade body. A further basic idea is that first insertion surfaces for turning the tooth bit are provided in the turning plates. Further, the basic idea of one preferred embodiment of the invention is that the distance transversally to the blade between the turning plates arranged substantially parallel to the intermediate part can be arranged to fit each blade by adjusting the thickness of the intermediate part. The basic idea of a second preferred embodiment of the invention is that the turning plates extend only part of the way from that end of the tool which comes into contact with the tooth bit towards the other end, whereby the intermediate part constitutes a turning arm. The basic idea of a third preferred embodiment of the invention is that the turning plates extend substantially throughout the entire length of the tool. The basic idea of yet a fourth preferred embodiment of the invention is that the intermediate part of the tool comprises at least one plate-like piece.

An advantage of the invention is that the same turning plates can be used in tools provided for blades that are different in thickness. Hence it is possible to manufacture turning plates in larger series than previously, whereby the manufacturing costs per tool can be reduced. Further, it is possible to use standard-type turning plates and customize a desired turning arm only in the intermediate part. If the turning plates and the intermediate part are easily detachable from one another, it is possible to combine different intermediate parts and turning plates in a simple manner to form a desired combination for every purpose. The intermediate part may comprise one or more cut-to-size plates that differ in thickness, which can be combined easily and flexibly to form a tool to fit every blade thickness. The tool may thus consist of modules. Furthermore, the batch size can be increased in manufacturing, if the turning plates are made mutually symmetrical. Symmetry has a further advantage that if the first insertion surfaces of the turning means wear at the innermost edge, the turning means may change places in the tool, and thereafter tooth bits can again be inserted with insertion surfaces that are in good condition. The tool's durability can be improved by manufacturing the turning plates of a material which has good wear and strength properties, such as high-quality tool-making steel or the like. The intermediate part, in turn, can be made of some other material that is more easily machineable and less expensive, for example, of a common construction steel. A further advantage of the invention is that the tool consists of separate pieces, which allows quicker and less expensive manufacturing as compared with making the necessary shapes in one piece. Sheet metal and die cutting techniques, as well as e.g. laser cutting, water jet cutting or flame cutting can be effectively utilized in manufacturing the tool of the invention, instead of the clearly more time-consuming and expensive machining. Eventual after-treatments of the separate turning plates, such as hardening and other heat treatments, and attachment of separate wear-resistant insertion surfaces are more easy and less expensive to perform on separate turning plates than on a one-piece tool.

Figure 2:
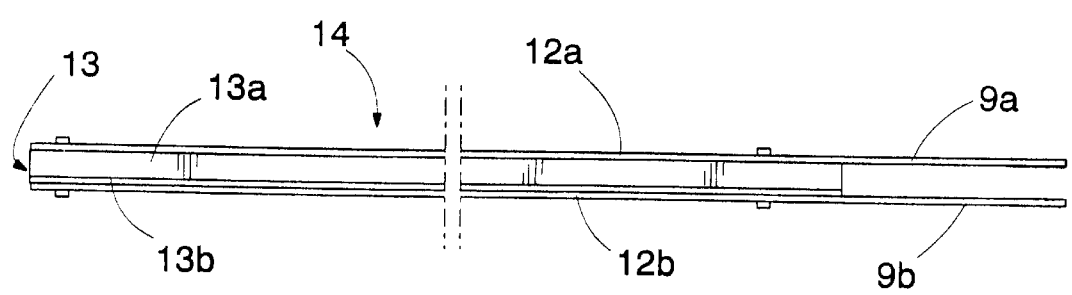
Figure 3A:
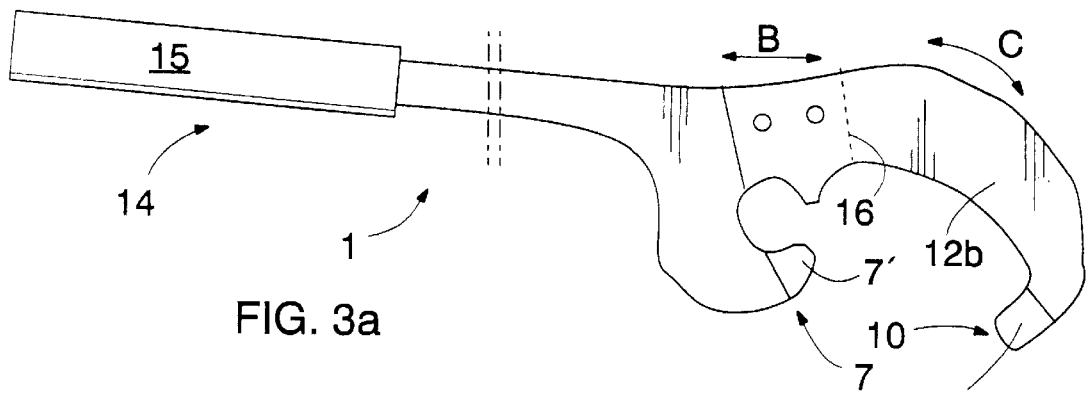
Figure 3B:
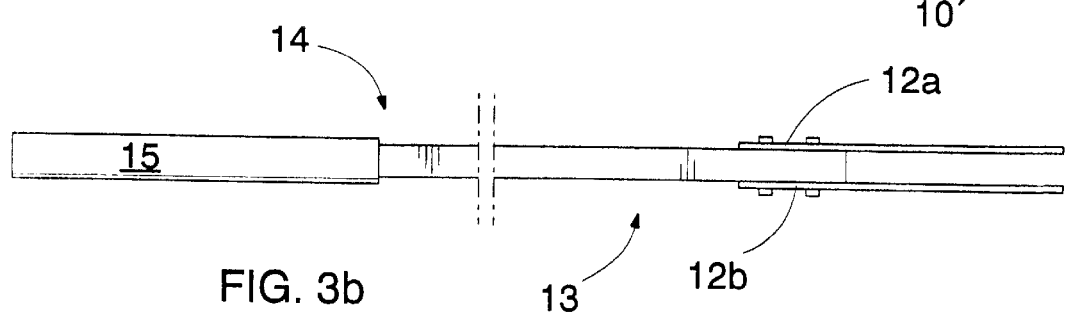

In the following, the invention will be described in greater detail with reference to the attached drawings, wherein FIG. 1 is a schematic side view of a tool in accordance with the invention in a mounting situation, FIG. 2 is a schematic top view of the tool of the preceding figure, FIG. 3a is a schematic side view of a second tool in accordance with the invention and FIG. 3b is a schematic top view of the tool in FIG. 3a, and FIGS. 4 to 6 are top views of yet some tools in accordance with the present inventive idea. It can be mentioned that in FIGS. 1 to 6 like reference numerals refer to like parts and that for clarity the operating end of the tool is illustrated emphasized.

FIG. 1 is a side view of a tool in accordance with the invention. With the tool 1 a tooth bit 2 is turned into place in a seat 4 provided in a blade body 3. The seat is preferably curved, and consequently the tooth bit insertion is performed by turning the tooth bit substantially with respect to the seat's center of curvature, whereby the tooth bit is subjected to the least possible strain during insertion. Transversally to the blade, the tooth bit is supported by means of support shoulders provided thereon. In the figure, a first support shoulder 5 and a second support shoulder 6 are illustrated in broken lines for clarity. The support shoulders fit on both sides of the blade in parallel therewith and they protrude to some extent with respect to the blade body, transversally to the blade, and with respect to the seat. Thus a force turning the tooth bit into its seat can be transferred on both sides of the blade with the tool from the lower part of the tooth bit to the first support shoulders 5 or to the back edge of the tooth bit, i.e. by means of insertion surfaces 10 acting on the edge opposite to the rake surface 8 and to the upper part of the tooth bit correspondingly by means of a second insertion surface 7 which is arranged to transmit the mounting power to the rake surface 8 of the tooth bit. The tool is formed such that its second insertion head is not in contact with the tooth bit's cutting edge, and so the insertion head cannot damage the tooth bit during insertion. The tool structure must be such that the tool's first end, which comes into contact with the tooth bit, is branched, in order to allow the first insertion surfaces 10 at the tool branch 9 ends to act on the first support shoulders 5 of the tooth bit without the tooth bit limiting the movements of the tool in any way. The tool is inserted in such a manner that the saw tooth 11 will be between the tool branches. In the solution of the invention the branched structure is achieved by constructing the tool such that it comprises an intermediate part and turning plates arranged on its opposing sides, substantially parallel with the blade, at least at the end which comes into contact with the tooth bit. The tool structure appears more clearly in this respect from FIG. 2 below. The first insertion surfaces 10 are provided in the turning plates 12*a* and 12*b*, which surfaces are preferably arranged to act on the first support shoulders 5 of the tooth bit. The second insertion surface 7, which is arranged to act on the upper part of the tooth bit 2, is preferably provided in the intermediate part 13, whereby it has a larger surface area than if it had been provided only in the turning plates 12*a* and 12*b*. It is possible that also the turning plates comprise the second insertion surface form. The turning plates can be permanently connected to the intermediate part, for instance, by spot or fusion welding, glueing, riveting or some other suitable manner. If detachable connection is desired, it can be performed, for instance, with screws, various transverse pins or by shapelocked arrangement. There is a variety of optional installation methods. Further, the length of the tool arm is selected such that a sufficient torque is obtained manually therewith. When selecting the length and shape of the turning arm 14, it is necessary to pay attention to the tool's handling properties: it must be easy and convenient to work with. The dimensions of the turning arm, such as length and angularity, may deviate from those presented in the figures.

FIG. 2 presents a top view of the tool of FIG. 1, i.e. the tool seen from direction A in FIG. 1. The figure shows the tool's branched end whose turning plates 12*a* and 12*b* form the branches 9*a* and 9*b* between which the blade body fits. In said tool, the intermediate part 13 consists of two plate-like pieces 13*a* and 13*b* that are different in thickness, by means of which the tool is arranged to correspond to the thickness of the blade. Naturally, the blade may also consist of one or more than two pieces. Further, in the solution presented in the figure, the turning plates extend up to the end of the tool's turning arm 14. Thus, if the tool is manufactured by die cutting, it is possible, in principle, to use the same cutting tool in manufacturing the intermediate parts and the turning plates. To obtain a fork-like structure, only portions corresponding to the branches are removed from the plates of the intermediate part.

FIG. 3*a* shows a second tool in accordance with the invention, which differs from the tool in the preceding figures so that herein the turning plates 12*a* and 12*b* do not extend throughout the tool 1, but they cover only that end of the tool which comes into contact with the tooth bit, as appears clearly from FIG. 3*b*. In this application, the intermediate part 13 constitutes the tool body. This structure enables the turning plate position with respect to the intermediate part 13 to be adjusted to fit every tooth bit size and shape. The distance in direction A and angularity C between the second insertion head 7 provided in the intermediate part and the first insertion heads 10 of the turning plates can thus be adjusted. Hence, the same turning plates and intermediate parts can be used to provide suitable tools for various kinds of tooth bits. Further, FIG. 3*a* shows separate, wear-resistant, strong insertion head bits 7' and 10' arranged at the points of the turning plates, which bits can be attached, for instance, by brazing, glueing or some other suitable manner. Regarding the tool's wear and mechanical durability, the most critical parts are the first insertion surfaces 10, because their contact surface with the tooth bit is small. Hence the insertion surface 10 is subjected to high surface pressure, despite the fact that mounting does not require any considerable force. When the turning plates are separate, it is easier than before to arrange thereto insertion head bits 10' of e.g. hard metal, stellite or some other material with particularly good wear and strength properties to serve as insertion surfaces. In principle, even brittle materials, such as ceramics, are suitable for the insertion surfaces 7' and 10', because in mounting, the insertion surface is substantially subjected only to pressing forces which these materials generally endure well. Moreover, it is possible to form the insertion head bits in accordance with the tooth bits to be inserted, when the turning plate proper may have a standard shape. The insertion surfaces of the tool can also be locally heat-treated, for instance, by induction hardening, whereby the most critical portions of the tool can be made more durable. Further, the turning means can be e.g. nitrogen-hardened, coated by hard-welding or otherwise treated to improve their properties. As distinct from the preceding figures, a handle 15 is arranged about the tool's turning arm 14, i.e. in this case at the open end of the intermediate part, which handle enables a good grip on the tool and thus improves the tool's handling properties. Furthermore, in the solution of FIG. 2, the handle may serve as a means which holds together the turning plates and the intermediate part consisting of a plurality of pieces, whereby no other attachment is necessary at least at the handle end. The handle may be, for instance, a plastic cast arranged about the turning arm. In the figure, that end of the intermediate part which comes into contact with the tooth bit is indicated with a broken line 16.

Figure 4:
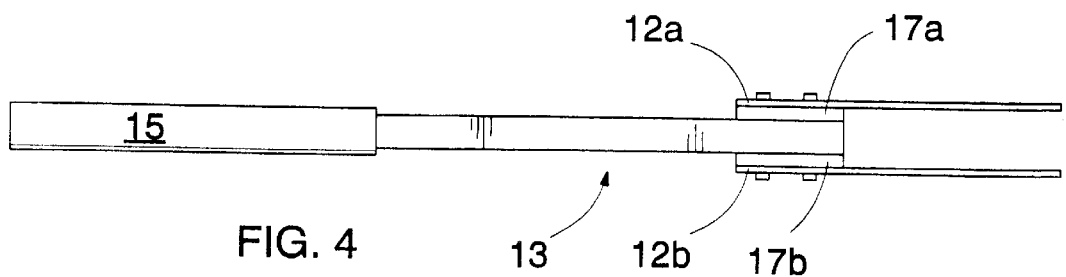

FIG. 4 shows a solution that is otherwise similar to the preceding FIG. 3*b* except that additionally to the intermediate part of FIG. 3*b*, the intermediate part 13 comprises separate expanding pieces 17*a* and 17*b*, by means of which the intermediate part is made wider. This solution has an advantage of providing a standard-type intermediate part, which comprises a turning arm 14 and a second insertion head and which can be arranged to fit the thickness of the blade by means of separate expanding pieces. Thus the standard-type intermediate part can be applied to tools intended for blades that differ in thickness.

Figure 5:
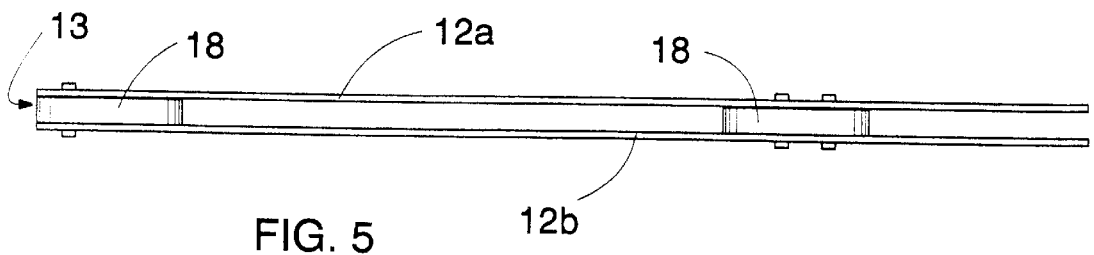

FIG. 5 shows a solution in which the intermediate part 13 comprises two or more spacing pieces 18 arranged at suitable points longitudinally to the tool, which spacing pieces may be of a suitably thick plate, or pieces cut to a desired length from a tube, bar or section. A second insertion surface is provided in the spacing piece at that end which comes into contact with the tooth bit.

Figure 6:
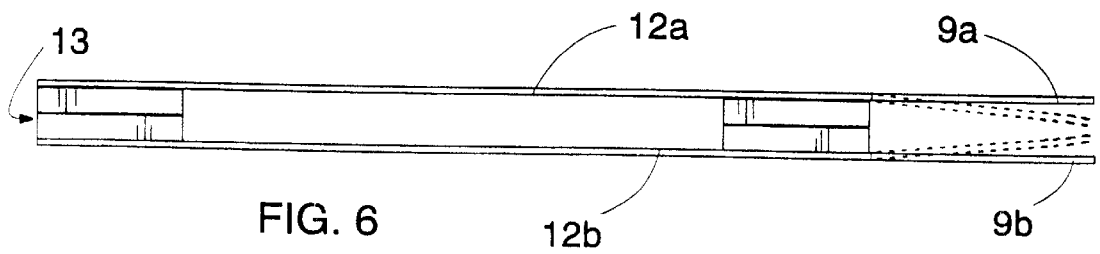

FIG. 6 shows a tool with a branched end, whose branches 9*a* and 9*b*, i.e. the projecting ends of the turning plates 12*a* and 12*b* can be bent towards one another, so that the tool can be adjusted to fit blades that differ in thickness. The branches can be bent towards one another, for instance, with a screw or some other suitable mechanism (not shown, for the sake of clarity). In the figure, the broken lines illustrate one bent position of the turning plates. In this application, the intermediate part is naturally formed in accordance with the thickest blade body. Furthermore, it is possible to construct the tool of the figure in such a way that the broken lines indicate a rest position of the branches of the turning means, wherefrom they are expanded to fit the blades that differ in thickness.

The drawings and the specification related thereto are only intended to illustrate the inventive idea. The details of the invention may vary within the scope of the accompanying claims. With the tool of the invention, it is thus possible to exert the insertion force on the tooth bit also in some other manner than by means of the support shoulders. In addition, it is possible to apply the tool also in connection with other tooth bits than those based on the shapelocked arrangement. Further, in the solutions of FIGS. 2 and 5, for instance, it is possible to make the intermediate part of a lighter material than the turning plates, such as wood, plastic or the like, because the turning plates receive the insertion forces exerted on the tool, while the intermediate part only provides that the space between the turning plates is correct. The second insertion surface can then be arranged in the turning plates, or the intermediate part may comprise a hard and wear-resistant separate piece at that point. Further, it is also possible to arrange means for inserting the tooth bits at both ends of the tool. The tool may then comprise means for inserting tooth bits for two different blades, or alternatively, both ends may have similar means. It is also possible to arrange means for inserting tooth bits at one end of the tool and means for detaching replaceable tooth bits at the other end of the tool.

What is claimed is:

1. An elongate tool for inserting separate tooth bits having opposite sides into seats provided in a saw blade body having opposite sides; said tool comprising:

first and second opposite end portions;

said first end portion comprising an arm for gripping of said tool by a user and turning of said tool;

said second end being generally C-shaped when viewed from a side thereof and having means for engaging and inserting the tooth bits into the seats in the saw blade body by a turning motion, said means include a pair of spaced parallel turning plates arranged for fitting on opposite sides of the tooth bit and the saw blade body and forming a forward portion of said C-shaped second end and defining tooth bit insertion surfaces on forward ends thereof, and an intermediate plate connected between and parallel with the rear ends of said parallel turning plates and forming a rear portion of said C-shaped second end and defining a tooth bit insertion surface on a rear end thereof.

2. An elongate tool as claimed in claim 1, wherein said intermediate plate has a thickness corresponding to a thickness of the saw blade body for spacing apart said turning plates to fit on opposite side of the saw blade body.

3. A tool as claimed in claim 2, wherein said intermediate plate comprises one or more plates of suitable thickness.

4. A tool as claimed in claim 2, wherein said intermediate plate comprises two or more separate spacing pieces arranged at suitable points longitudinally to the tool.

5. A tool as claimed in claim 1, including means for adjusting the position of said turning plates in relating to said intermediate plate so that the angularity and distance between said turning plate insertion surfaces and said intermediate plate insertion surface are adjustable to correspond to every tooth bit to be inserted.

6. A tool as claimed in claim 1, wherein said turning plates include means for detaching said turning plate from said tool.

7. A tool as claimed in claim 6, wherein said turning plates are mutually symmetrical so that they are interchangeable with respect to the intermediate plate.

8. A tool as claimed in claim 1, wherein said tool bit insertion surfaces on said turning plates comprise separate members constructed of wear-resistant and hard materials.

\* \* \* \* \*